(12) United States Patent
Sulton et al.

(10) Patent No.: US 8,713,544 B1
(45) Date of Patent: Apr. 29, 2014

(54) UNIVERSAL DATA-DRIVEN COMPUTER PROXY

(75) Inventors: Jeffrey Sulton, Los Angeles, CA (US); Bruce McCorkendale, Manhattan Beach, CA (US); Carey Nachenberg, Northridge, CA (US)

(73) Assignee: Symantec Corporation, Cupertino, CA (US)

( * ) Notice: Subject to any disclaimer, the term of this patent is extended or adjusted under 35 U.S.C. 154(b) by 2324 days.

(21) Appl. No.: 10/722,949

(22) Filed: Nov. 25, 2003

(51) Int. Cl.
*G06F 9/44* (2006.01)
*G06F 9/45* (2006.01)

(52) U.S. Cl.
USPC ............ 717/143; 717/142; 717/147; 717/168

(58) Field of Classification Search
None
See application file for complete search history.

(56) References Cited

U.S. PATENT DOCUMENTS

| | | | |
|---|---|---|---|
| 3,969,723 A | 7/1976 | Kennicott | |
| 4,558,413 A | 12/1985 | Schmidt et al. | |
| 4,714,992 A | 12/1987 | Gladney et al. | |
| 4,809,170 A | 2/1989 | Leblang et al. | |
| 5,155,847 A | 10/1992 | Kirouac et al. | |
| 5,182,806 A | 1/1993 | McKeeman et al. | |
| 5,204,960 A | 4/1993 | Smith et al. | |
| 5,479,654 A | 12/1995 | Squibb | |
| 5,485,575 A | 1/1996 | Chess et al. | |
| 5,495,610 A | 2/1996 | Shing et al. | |
| 5,519,866 A | 5/1996 | Lawrence et al. | |
| 5,566,335 A | 10/1996 | Nash et al. | |
| 5,574,906 A | 11/1996 | Morris | |
| 5,581,764 A | 12/1996 | Fitzgerald et al. | |
| 5,649,200 A | 7/1997 | Leblang et al. | |
| 5,671,398 A | 9/1997 | Neubauer | |
| 5,673,387 A | 9/1997 | Chen et al. | |
| 5,675,801 A * | 10/1997 | Lindsey | 717/108 |
| 5,684,875 A | 11/1997 | Ellenberger | |
| 5,699,275 A | 12/1997 | Beasley et al. | |
| 5,729,743 A | 3/1998 | Squibb | |
| 5,790,856 A | 8/1998 | Lillich | |
| 5,799,189 A | 8/1998 | Koser et al. | |
| 5,893,113 A | 4/1999 | McGrath et al. | |
| 5,905,896 A | 5/1999 | Delannoy | |
| 5,909,581 A | 6/1999 | Park | |
| 5,933,647 A | 8/1999 | Aronberg et al. | |
| 5,940,615 A * | 8/1999 | Novick et al. | 717/109 |
| 5,948,104 A | 9/1999 | Gluck et al. | |

(Continued)

OTHER PUBLICATIONS

Ryan et al., Using Event-Based Parsing to Support Dynamic Protocol Evolution, Published on Mar. 2003, University of Colorado Department of Computer Science, Technical Report CU-CS-947-03, pp. 1-11.*

(Continued)

*Primary Examiner* — Tuan Q. Dam
*Assistant Examiner* — Zheng Wei
(74) *Attorney, Agent, or Firm* — Fenwick & West LLP

(57) ABSTRACT

Methods, apparati, and computer-readable media for updating proxy executable code. An apparatus embodiment of the present invention comprises generic universal proxy executable code that can be instantiated multiple times, with each instance being driven by a different set of files comprising a protocol specification file and a proxy activity code file, to control protocol decomposition and proxy functions, respectively. In a method embodiment of the present invention, a protocol specification is created or updated; proxy activity code, separate from the protocol specification, is created or updated; and the proxy executable code is executed using the protocol specification and the proxy activity code.

26 Claims, 4 Drawing Sheets

(56) References Cited

U.S. PATENT DOCUMENTS

| | | | |
|---|---|---|---|
| 5,953,532 A | 9/1999 | Lochbaum | |
| 5,960,204 A | 9/1999 | Yinger et al. | |
| 6,006,034 A | 12/1999 | Heath et al. | |
| 6,006,242 A | 12/1999 | Poole et al. | |
| 6,035,423 A | 3/2000 | Hodges et al. | |
| 6,052,531 A | 4/2000 | Waldin, Jr. et al. | |
| 6,081,814 A | 6/2000 | Mangat et al. | |
| 6,088,803 A | 7/2000 | Tso et al. | |
| 6,092,080 A | 7/2000 | Gustman | |
| 6,119,165 A | 9/2000 | Li et al. | |
| 6,151,643 A | 11/2000 | Cheng et al. | |
| 6,178,551 B1 | 1/2001 | Sana et al. | |
| 6,268,852 B1* | 7/2001 | Lindhorst et al. | 715/744 |
| 6,349,407 B1 | 2/2002 | Towfiq | |
| 6,385,661 B1* | 5/2002 | Guthrie et al. | 719/316 |
| 6,418,555 B2 | 7/2002 | Mohammed | |
| 6,484,315 B1 | 11/2002 | Ziese | |
| 6,510,552 B1 | 1/2003 | Benayoun et al. | |
| 6,513,154 B1* | 1/2003 | Porterfield | 717/101 |
| 6,535,894 B1 | 3/2003 | Schmidt et al. | |
| 6,564,265 B2* | 5/2003 | Tillmann et al. | 709/246 |
| 6,594,823 B1* | 7/2003 | Corbin et al. | 717/143 |
| 6,625,804 B1* | 9/2003 | Ringseth et al. | 717/114 |
| 6,651,249 B2 | 11/2003 | Waldin et al. | |
| 6,654,787 B1 | 11/2003 | Aronson et al. | |
| 6,771,765 B1 | 8/2004 | Crowther et al. | |
| 6,959,432 B2* | 10/2005 | Crocker | 717/126 |
| 7,069,543 B2* | 6/2006 | Boucher | 717/127 |
| 7,124,406 B2* | 10/2006 | Ryu | 717/144 |
| 7,130,898 B2* | 10/2006 | Carter | 709/223 |
| 7,194,733 B2* | 3/2007 | Ringseth et al. | 717/136 |
| 7,272,822 B1* | 9/2007 | Riggins et al. | 717/124 |
| 7,281,237 B2* | 10/2007 | de Jong | 717/126 |
| 7,356,803 B2* | 4/2008 | Bau et al. | 717/116 |
| 7,360,200 B2* | 4/2008 | Boucher | 717/100 |
| 7,401,326 B1* | 7/2008 | Durham et al. | 717/139 |
| 7,418,659 B2* | 8/2008 | Ramani et al. | 715/234 |
| 7,426,717 B1* | 9/2008 | Schang et al. | 717/124 |
| 7,437,710 B2* | 10/2008 | Bau et al. | 717/117 |
| 8,335,862 B2* | 12/2012 | Fletcher et al. | 709/250 |
| 8,589,594 B2* | 11/2013 | Fletcher et al. | 709/250 |
| 2002/0162091 A1* | 10/2002 | Crocker | 717/126 |
| 2004/0073891 A1* | 4/2004 | Boucher | 717/127 |
| 2004/0088425 A1* | 5/2004 | Rubinstein et al. | 709/230 |
| 2004/0133776 A1 | 7/2004 | Putzolu | |
| 2004/0143814 A1* | 7/2004 | de Jong | 717/104 |
| 2004/0226030 A1* | 11/2004 | Marvin et al. | 719/328 |
| 2005/0022208 A1* | 1/2005 | Bolar et al. | 719/315 |
| 2007/0271554 A1* | 11/2007 | Fletcher et al. | 717/147 |
| 2008/0022276 A1* | 1/2008 | Coppinger et al. | 717/178 |
| 2012/0266132 A1* | 10/2012 | Coppinger et al. | 717/109 |

OTHER PUBLICATIONS

U.S. Appl. No. 10/211,827, filed Aug. 2, 2002, Nachenberg.
"User-Friendly Interface for Applying Specific Levels of Coordinated Updates to Software in the Field," IBM Technical Disclosure Bulletin, vol. 31, No. 10, Mar. 1989, Armonk, NY, U.S.A.
Ambriola, Vincenzo; Bendix, Lars; and Ciancarini, Paolo, "The Evolution of Configuration Management and Version Control," Software Engineering Journal, Nov. 1990, pp. 303-310, retrieved from IEEE database, Sep. 24, 2002, U.S.A.
CAUCE.org web pages [online] Coalition Against Unsolicited Commercial Email [retrieved Mar. 17, 2003] Retrieved from the Internet: <URL:http://www.cauce.org/about/problem.shtml>.
Grundy, et al., "Support for Collaborative, Integrated Software Development," Proc 95 Software Engineering Environments, Abstract Only, Apr. 1995, U.S.A.
Hedin, Gorel, "Incremental Execution in a Programming Environment Based on Compilation," Proc. of Nineteenth Hawaii Intl. Conf. on System Sciences, Abstract Only, Jan. 1986, U.S.A.
Hurwitz Group, "Application Management for Distributed Applications," pp. 1-7, Jun. 1998, U.S.A.
Lindsay, Peter; Liu, Yaowei, and Traynor, Owen, "A Generic Model for Fine Grained Configuration Management Including Version Control and Traceability," 1997 IEEE, retrieved from the IEEE database Sep. 24, 2002, U.S.A.
Marimba, "Castanet 3.0 Product Family," Jun. 1998, U.S.A.
Marimba, "Castanet Infrastructure Suite," Jun. 1998, U.S.A.
Marimba, "Castanet Management Suite," Jun. 1988, U.S.A.
Marimba, "Castanet Production Suite," Jun. 1998, U.S.A.
Pocket Soft, ".RTPatch® Professional for Windows, NT, and DOS Binary Update System," pp. 1-6. Jun. 23, 1998, http://www.pocketsoft.com\whtwind.html, U.S.A.
Pollock, Lori, "Incremental Version of Iterative Data Flow Analysis," IEEE Trans Software Eng., v 15, n 12, Abstract Only, Dec. 1989, U.S.A.
Reichenberger, Christoph, "Orthogonal Version Management," Universitat Linz, Institute fur Informatik, Austria, 1989 ACM.
"News Release—Symantec Delivers Cutting-Edge Anti-Virus Technology with Striker32", Oct. 1, 1999, 2 pages, [online]. Retrieved on Nov. 11, 2003. Retrieved from the Internet:<URL:http://www.symantec.com/press/1999/n991001.html>. Author unknown.
"Software: Windows ME; Windows ME and System File Protection", [online] last updated Mar. 11, 2002, [retrieved on Apr. 9, 2002] Retrieved from the Internet: <URL:http//www.wackyb.co.nz/mesfp.html>.
Morar, J. E. and Chess, D. M., "Can Cryptography Prevent Computer Viruses?", Virus Bulletin Conference 2000, Sep. 2000, pp. 127-138, Virus Bulletin Ltd., Oxfordshire, England.
Wikipedia.org web pages [online], Wikipedia, [Retrieved Mar. 17, 2003] Retrieved from the Internet: <ULR: http://www.wikipedia.org/w/wiki.phintl?title=machine learning and printable=yes>.
MacNamra, John E., "Technical Aspects of Data Communication", 2ed. 1982, Digital Equipment Corporation, U.S.A. pp. 110-122.
Ore, Oystein, "Number Theory and Its History", 1976 Gudron Ore, U.S.A. pp. 124-129.
Keneipp, Ray, Traffic Shaping [Online], May 14, 2001, [retrieved from the Internet on Apr. 27, 2004] Retrieved from the Internet: <URL: Itworld.com—supersite manager—Traffic Shaping http://www.itworld.com/nl/sup_mgr/05142001/>.
ISP—Planet Staff, Slower Spam Would Annoy Spammers [Online] Feb. 20, 2003, [retrieved from the Internet on Apr. 22, 2005]. Retrieved from the Internet: <URL: ISP—Planet—Equipment—Slower Spam Would Annoy Spammers, http://www.isp-planet.com/equipment/2003/spamsquelcher.html>.
PR Newswire, "Spam Squelcher Technology Cuts Costly Impact of Spam on Enterprises and ISPs;" New Product from ePrivcacy Group turns back Spam Attacks with False Positives, [Online] Feb. 11, 2003, [Retrieved from the Internet on May 3, 2004]. Retrieved from the Internet:< URL: PR Newswire Spam Squelcher Technology Cuts Costly Impact of Spam on Enterprises and ISPs http://www.findarticles.com/cf_dis/m4prn/2003_Feb_11/97463210/p1/article.jhtml>.
Jee, et al., "A Generic Virus Detection Agent on the Internet", pp. 210-219, 1997 IEEE, retrieved May 10, 2006, Taiwan.
Bellare et al., "Incremental Cryptography and Application to Virus Protection", pp. 45-56, 1995 ACM, retrieved May 10, 2006, New York, NY.
"Gold Parser, A Free, Multi-Platform Parser Generator" [online], devincook.com, [retrieved on Oct. 7, 2003]. Retrieved from the Internet: <URL: http://www.devincook.com/goldparser/index.htm.
"RFC 2821—Simple Mail Transfer Protocol," Klensin, J., Editor, Apr. 2001, [online], faqs.org, [retrieved on Oct. 13, 2003]. Retrieved from the Internet: <URL: http://www.faqs.org/rfcs/rfc2821.html.

* cited by examiner

UNIVERSAL DATA-DRIVEN COMPUTER PROXY

TECHNICAL FIELD

This invention pertains to the field of creating and updating computer proxies.

BACKGROUND ART

There are many computer products that contain proxies for many protocols. This is especially true for data security products. In particular, desktop, gateway, and appliance versions of antivirus, firewall, antispam, content inspection, logging, filtering, intrusion prevention, and intrusion detection products all contain proxies for many protocols. Many of these products' proxies are for the same protocols, but each proxy is implemented independently. New protocols come along frequently, and support for a greater number of protocols would be beneficial for all such products. Furthermore, support for existing protocols often needs to be updated due to changes in the way the protocol is used, understood, or defined. Implementation of proxies for new protocols, or updates to existing proxies, is usually a difficult and lengthy task and is often error prone. Furthermore, updating products in the field to add support for new protocols can be disruptive if such updates require a restart of the proxy executable, and these updates usually do require such a restart.

When tasked with writing a proxy for a given protocol, a computer programmer usually begins by looking up the protocol's specification. This specification may be published in the form of an RFC (Request for Comments) by the authority that defines the protocol. The RFC usually defines the protocol using a grammar such as BNF (Backus-Naur Form). Typically, the programmer then writes a proxy that intertwines a custom protocol decomposer (based upon the programmer's interpretation of the RFC) with application specific logic to implement the proxy activity code. Little, if any, of this proxy work can be used for creation of a new proxy. The treatment of a given protocol stream by different handcrafted protocol decomposition implementations is likely to vary widely, and is unlikely to rigorously match all aspects of the BNF from the RFC. Furthermore, such traditional proxies are delivered to customers as executable binaries, and customers are loath to update or deploy new executable binaries in the field, especially when doing so requires a restart of the proxy executable. When the BNF specification for the protocol changes, making the requisite changes to a traditional proxy implementation can be tedious, even if such changes are immaterial to the proxy activity code.

The present invention overcomes the aforementioned problems associated with the conventional art.

DISCLOSURE OF INVENTION

Methods, apparatus, and computer-readable media for updating proxy executable code (5). An apparatus embodiment of the present invention comprises generic universal proxy executable code (5) that can be instantiated multiple times, with each instance being driven by a different set of files comprising a protocol specification file (1) and a proxy activity code file (2), to control protocol decomposition and proxy functions, respectively. In a method embodiment of the present invention, a protocol specification (1) is created or updated (21); proxy activity code (2), separate from the protocol specification (1), is created or updated (22); and the proxy executable code (5) is executed (23) using the protocol specification (1) and the proxy activity code (2).

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1:
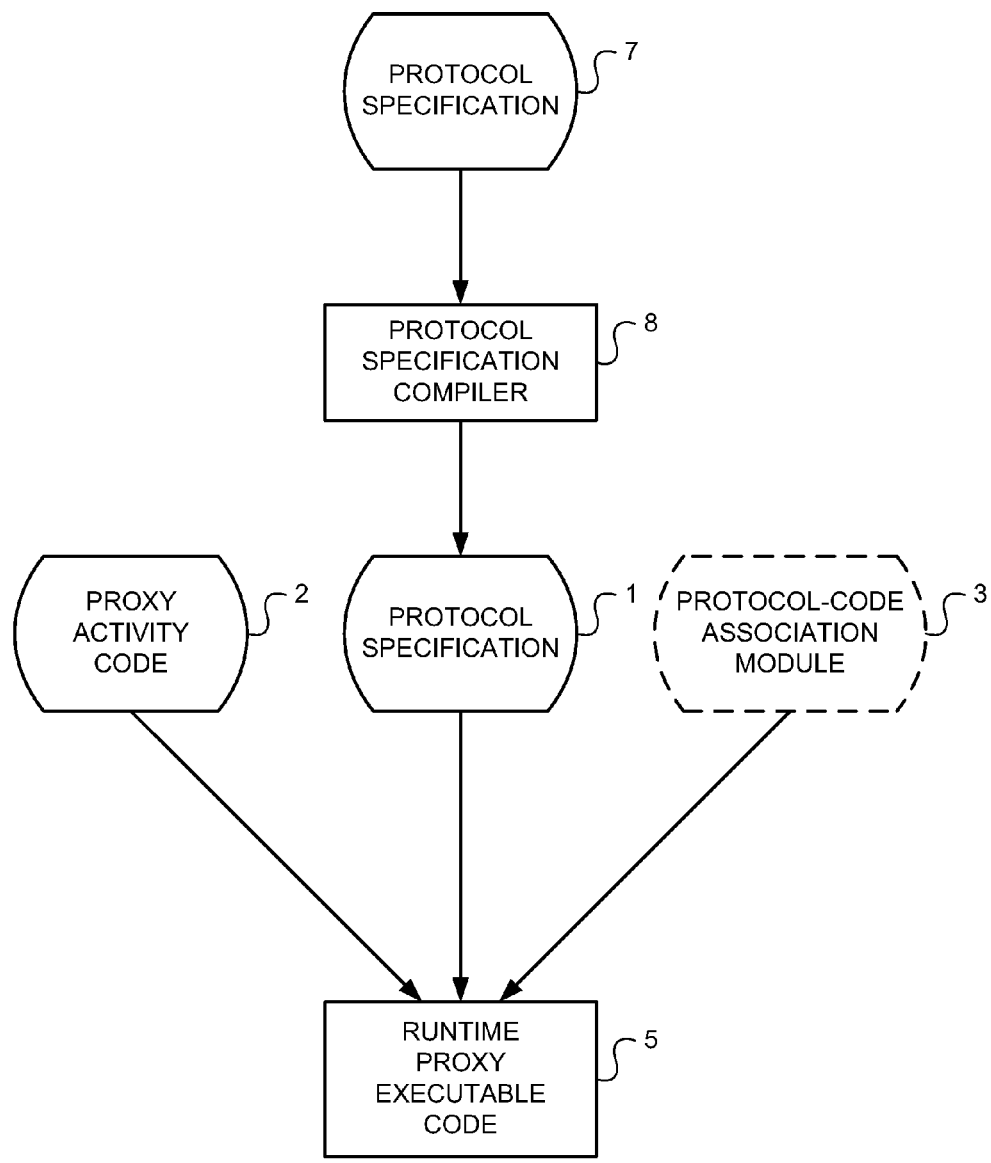
FIG. 1 is a system level diagram illustrating apparatus of the present invention.

As used throughout the present specification including claims, the following terms have the following meanings:

"Proxy" is defined in the broad sense to mean a computational module containing executable code implementing a certain protocol. A firewall proxy, for example, inspects messages that enter the firewall. The computational module can be implemented in software (including scripting as well as compiled binary code), firmware, and/or hardware. The executable code can be in the form of a .DLL that requires some other module to execute said executable code.

"Protocol" is an ordered sequence of rules for performing a function on a computer system. Examples of protocols include SMTP, HTTP, FTP, and instant messaging protocols. An SMTP protocol, for example, defines the function of sending e-mail messages.

"Protocol specification" is the architectural definition that gives the essential features of the protocol.

"Proxy activity code" is computer code that performs the mandatory and/or optional features of the protocol. There can be many proxy activity codes associated with a single protocol specification.

"Coupled" means any type of direct or indirect communicative relationship.

"Data-driven" module is a module that is updated by just one or more data files, i.e., no executables are needed to update the module. Execution of a data-driven executable module is driven or affected by the data consumed by the executable module.

"Updating" proxy 5 means creating or updating proxy 5.

A protocol is usually published in the form of an RFC (Request for Comments) from the protocol authority, e.g., IETF (Internet Engineering Task Force). The protocol is usually described by using a preselected grammar 7, such as one of the BNFs (Backus-Naur Forms). These BNFs include conventional BNF, EBNF (Extended Backus-Naur Form), and ABNF (Augmented BNF). In the present invention, the protocol specification's grammar 7 can also comprise natural English or other natural language, regular expression, or a grammar that can be understood by one of the software tools known as Lex, Yacc, Gold, and Spirit. Lex and Yacc are third party Open Source tools, and require their inputs to be in BNF. The Gold parser is a Yacc-like tool that allows specification of grammars (typically programming language grammars) using BNF but not EBNF. The output of a Gold parser is a data file that represents the grammar. Spirit is the parsing component of the Boost library, an Open Source library of libraries. Lex, Yacc, Gold, and Spirit can be used to help create protocol specification compiler 8.

Below is an excerpt from RFC 2821 (the SMTP protocol) giving an example of ABNF:

The syntax for a positive response, using the ABNF notation and terminal symbols of [8], is:

```
ehlo-ok-rsp=("250" domain [SP ehlo-greet] CRLF)
    /("250-" domain [SP ehlo-greet] CRLF
        *("250-" ehlo-line CRLF)
            "250" SP ehlo-line CRLF)
ehlo-greet=1*(% d0-9/% d11-12/% d14-127)
    ; string of any characters other than CR or LF
ehlo-line=ehlo-keyword*(SP ehlo-param)
ehlo-keyword=(ALPHA/DIGIT)*(ALPHA/DIGIT/"-")
    ; additional syntax of ehlo-parms depends on
    ; ehlo-keyword
ehlo-param=1*(% d33-127)
    ; any CHAR excluding <SP> and all
    ; control characters (US-ASCII 0-31 inclusive)
```

Turning to FIG. 1, runtime proxy executable code 5 is the code that performs the proxy function or functions. The term "runtime proxy executable code" is sometimes used interchangeably herein with the term "proxy". Proxy executable code 5 can be instantiated multiple times, as described below.

The protocol specification 7 is normally provided using a grammatical form 7, as discussed above. Protocol specification compiler 8 is a module that takes the grammatical form 7 as input, and outputs a protocol specification file 1 that represents the protocol specification in a more compact form. In one embodiment, protocol specification 1 consists solely of data and does not contain any executable code.

Proxy activity code 2 is generated independently of the protocol specification 1. In one embodiment, proxy activity code 2 consists solely of data and does not contain any executable code. In one embodiment, proxy activity code 2 is written in a scripting language such as Java, Visual Basic, or P-Code. P-Code is a scripting language developed by Symantec Corporation of Cupertino, Calif., and is used in Symantec's antivirus, intrusion detection, and firewall products.

Each instance of runtime proxy executable code 5 consumes, as input, the protocol specification 1 and proxy activity code 2 associated with that instance. In one embodiment, optional protocol-code association module 3, which links elements of proxy activity code 2 with elements of protocol specification 1, is also an input to runtime proxy executable code 5. Modules 1, 2, 3, 5, 7, and 8 can be embodied in software, firmware, and/or hardware, or any combination thereof.

Runtime proxy executable code 5 can be instantiated multiple times, each time with different inputs 1, 2, and/or 3, to support different protocols, or the same protocols for different purposes (functions). Thus, proxy 5 is a true universal (generic) reusable proxy. At least one protocol specification 1 can consist solely of data (i.e., not contain any executable code). Similarly, at least one proxy activity code 2 can consist solely of data (i.e., not contain any executable code). In the case where two or more instances of the same proxy 5 are used to implement the same protocol but for different purposes, the protocol specification file 1 is the same for each instance, but protocol-code association module 3 (if present) and proxy activity code file 2 are different. In all cases, runtime proxy executable code 5 uses the protocol specification file 1 to decompose and verify the protocol, while invoking proxy activity code 2 at appropriate points in the decomposition, as specified by protocol-code association module 3.

Protocol specification 1 can also be made to be universal. In this scenario, the same protocol specification file 1 is instantiated multiple times and used with different proxy activity code files 2 (and protocol-code association module 3 if present) to perform different activities for the same protocol. For each instance of protocol specification file 1, proxy 5 can be the same (i.e., it can be a universal proxy), or different versions of proxy 5 can be used.

Protocol-code association module 3 can be implemented by extending the grammatical form 7 of the protocol specification to contain information as to points where the proxy activity code 2 is to be executed. This information is processed by protocol specification compiler 8 via a field called, e.g., [ACTION]. Then, information contained in protocol-code association module 3 informs runtime proxy executable code 5 that proxy activity code 2 is to be executed at these points. If optional protocol-code association module 3 is not used, information that would otherwise be contained in module 3 is located in some combination of modules 1 and 2.

Protocol specification compiler 8 is executed only when the protocol is first implemented or when the protocol specification 7 has changed. Runtime proxy executable code 5 is executed whenever it is desired to perform the function of that proxy.

Figure 2:
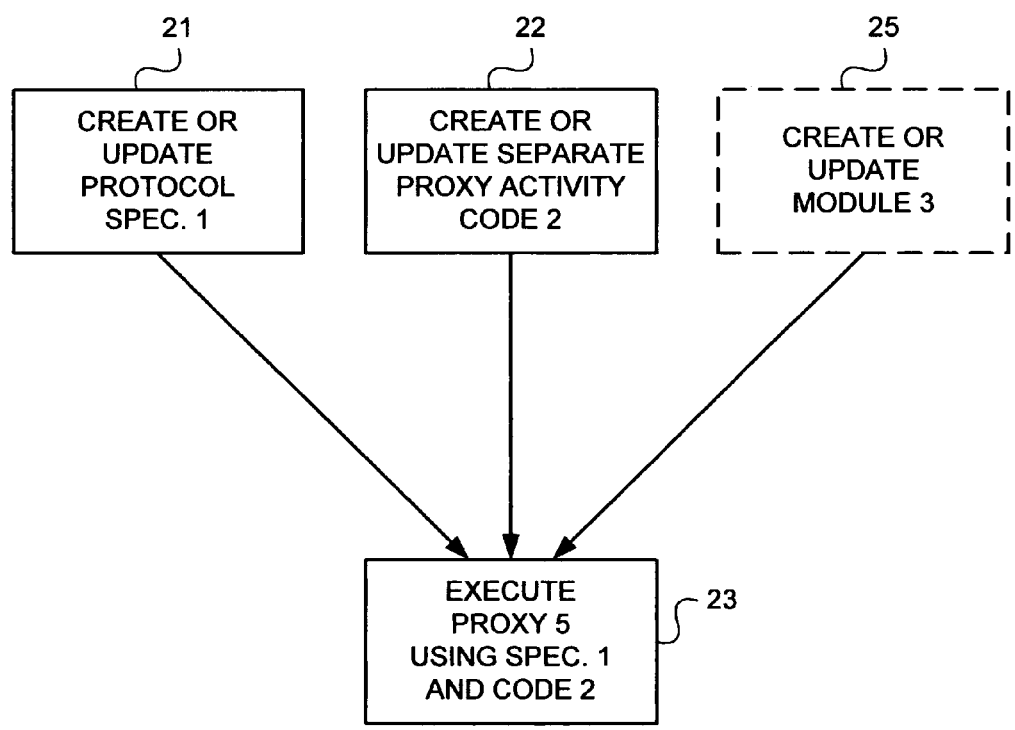
FIG. 2 is a flow diagram illustrating a first method embodiment of the present invention.

A first method embodiment is illustrated in FIG. 2. At step 21, protocol specification compiler 8 is invoked to create or update protocol specification 1. Protocol specification compiler 8 has as an input a protocol specification 7. The protocol specification 7 may be in a grammatical form such as BNF, EBNF, ABNF, natural English or other natural language, regular expression, or grammar understood by Lex, Yacc, Gold, or Spirit. At step 22, proxy activity code 2, separate and apart from protocol specification 1, is created or updated. In one embodiment, proxy activity code 2 is written in a scripting language such as Java, Visual Basic, or P-Code.

At optional step 25, protocol-code association module 3 is created or updated. In one embodiment, module 3 consists solely of data and does not contain any executable code.

At step 23, runtime proxy executable code 5 is executed using the latest versions of modules 1 and 2 (and module 3 when present). Module 5 (for example a firewall proxy) may be executing constantly, although perhaps idly most of the time. In this case, module 5 does not have to be provided with the latest versions of modules 1, 2, and/or 3 repeatedly, unless contents of modules 1, 2, and/or 3 have changed. The updating of module 5 can be accomplished by providing for a routine within module 5 that checks to see, before accepting new data from modules 1, 2, and/or 3, whether contents of modules 1, 2, and/or 3 have changed. Flags associated with module 5 can be used to indicate whether the contents of modules 1, 2, and/or 3 have changed.

Protocol specification 1 and proxy activity code 2 can be updated independently of each other and independently of the execution of runtime proxy executable code 5 (and independently of the updating of protocol-code association module 3 when said module 3 is present). Protocol specification 1, proxy activity code 2, and/or protocol-code association module 3 can be updated at remote client sites by means of the author of said modules 1, 2, and/or 3 using a push technology such as Live Update popularized by Symantec Corporation of Cupertino, Calif.

Figure 3:
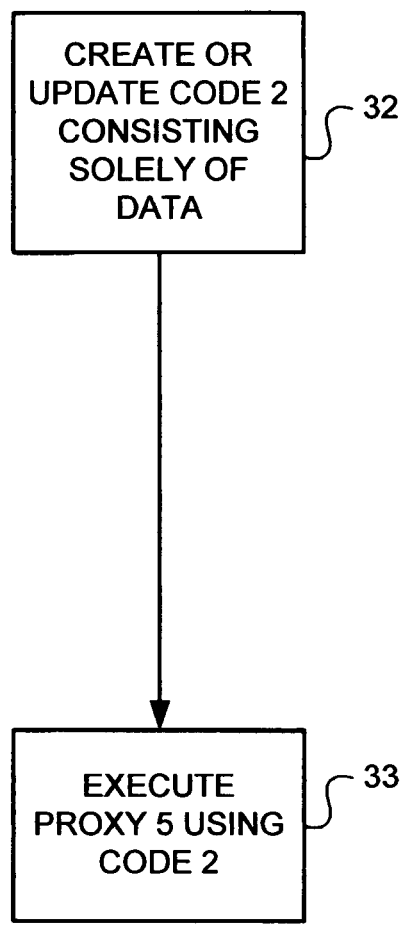
FIG. 3 is a flow diagram illustrating a second method embodiment of the present invention.

A second method embodiment of the present invention is illustrated in FIG. 3. At step 32, proxy activity code 2 is created or updated. In this embodiment, code 2 consists solely of data and does not contain any executable code.

At step 33, runtime proxy executable code 5 is executed using proxy activity code 2.

In all respects not expressly mentioned herein, the embodiment illustrated in FIG. 3 can contain any or all of the features of the embodiment illustrated in FIG. 2.

In the embodiment illustrated in FIG. 3, module 5 is data-driven with respect to proxy activity code 2 but is not necessarily data-driven with respect to protocol specification 1. This embodiment is useful where protocol specification 1 is unlikely to change, but proxy activity code 2 is updated frequently. In this embodiment, protocol specification 1 may be in the form of source code that calls out at specified points to a P-Code (or other scripting) engine to invoke proxy activity code 2. This makes for faster protocol decomposition, while still allowing data-driven proxy activity code 2 that is easily updatable in the field without requiring restarts of proxy 5.

Figure 4:
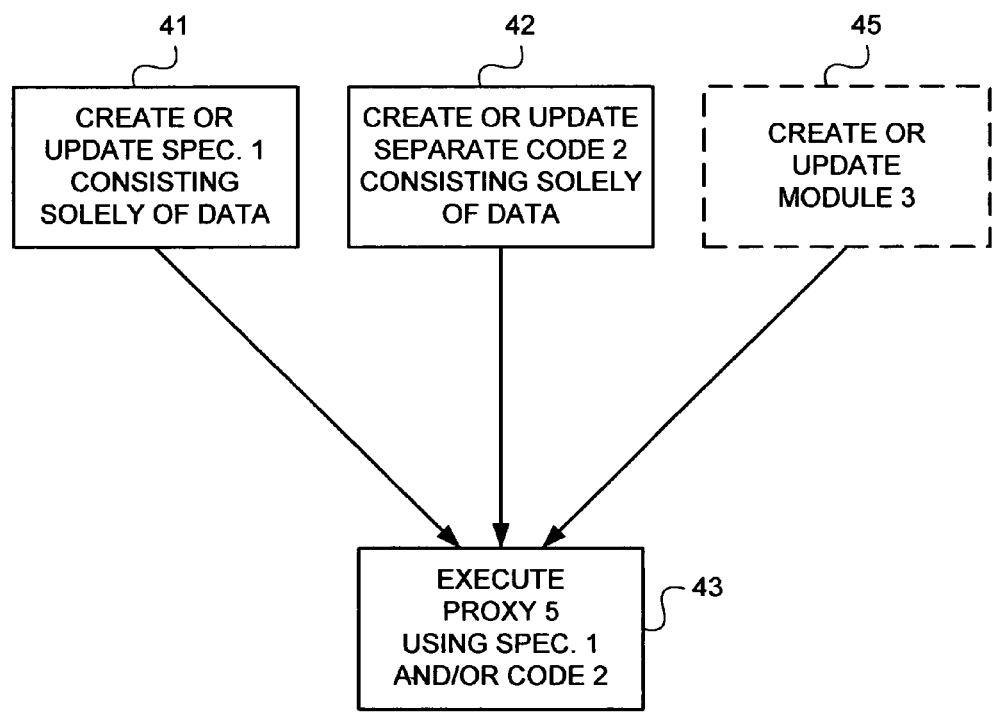
FIG. 4 is a flow diagram illustrating a third method embodiment of the present invention.

A third method embodiment of the present invention is illustrated in FIG. 4. At step 41, protocol specification 1 is created or updated. In this embodiment, specification 1 consists solely of data and does not contain any executable code.

At step 42, proxy activity code 2, separate and apart from protocol specification 1, is created or updated. In this embodiment, proxy activity code 2 consists solely of data and does not contain any executable code.

At optional step 45, protocol-code association module 3 is created or updated. In an embodiment, module 3 consists solely of data and does not contain any executable code.

At step 43, runtime proxy executable code 5 is executed using protocol specification 1 and proxy activity code 2, and optional protocol-code association module 3 if present.

In all respects not expressly mentioned herein, the embodiment illustrated in FIG. 4 can contain any or all of the features of the embodiment illustrated in FIG. 2.

It can be seen from the above discussion that the present invention eases the creation, maintenance, re-use, and distribution of proxies 5, and the re-use of protocol specifications 7 among proxies 5 whose purposes may differ, but which operate on the same protocol 7. Regardless of their eventual purpose, all proxies 5 that operate on streams for the same protocol 7 share the required task of proper decomposition (parsing) of that protocol 7. The present invention allows the protocol model 7 to be specified in a reusable way 1 that is independent of the logic 2 that performs the application specific tasks for a given proxy 5.

The present invention further allows the author of a proxy 5 to be rigorous in the decomposition of a protocol 7 while still allowing the flexibility to tolerate typical deviations from the standard 7. Specification of the protocol is easier, yet rigorous, since the grammar 7 from the protocol definition (e.g., from an RFC) can be used directly. In addition, the present invention allows updates of the protocol specification 1 independently of updates to the application specific logic in the proxy activity code 2. Updates to the protocol specification 1 and/or the proxy activity code 2 can be delivered as data rather than as executable binary code, making it easier to provide updates that do not require a restart of runtime proxy executable code 5. Thus, customers are more likely to adopt the updates.

The invention illustrated herein advantageously allows enterprises to more quickly provide security for more protocols, to provide timely unobtrusive updates that add new proxies 5 or that update existing proxies 5, and to provide more rigorous and therefore more secure treatment of protocols. Using a grammatical form 7 of the protocol specification and a protocol specification parser (compiler) 8 makes protocol decomposition easier and quicker for the author. In addition, the resulting protocol decomposition 1 is likely to be more rigorous and accurate than a handcrafted version would be. Having the runtime proxy executable code 5 consume the protocol specification 1 from a data file allows the same protocol specification 1 to be re-used for multiple proxies 5, and it allows easy unobtrusive updates to the protocol specification 1 in the field. Furthermore, because the protocol specification 1 is independent of the proxy activity code 2, if the protocol specification 1 is updated, all proxies 5 that work with that protocol can benefit without having to repeat the update work for each individual proxy 5. Using P-Code or another scripting language for proxy activity code 2 allows for easy unobtrusive updates to application specific logic 2; because of the isolation of the protocol specification 1 from the proxy activity code 2, changes to one 1,2 are unlikely to affect the other 2,1. Updating a product in the field to add support for a new protocol becomes significantly easier when using this invention, because all that is needed is a new instance of the runtime proxy executable code 5 that takes some new data files 1, 2, and/or 3 as input. Because of the efficiency and ease-of-use gains, protocols that would otherwise go unsupported are more likely to be supported. Support for more protocols, quick updates to support new protocols when they arrive, and quick updates to support the most recent changes to protocol specifications 7 are important distinctions with respect to previous art.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A computer program product having a non-transitory computer-readable storage medium having executable computer program instructions embodied therein for implementing a generic reusable computer proxy, the computer program product comprising computer program instructions for:

identifying a protocol specification associated with a given protocol, the protocol specification including non-executable data facilitating decomposition of the protocol, the non-executable data comprising information identifying a plurality of points in the protocol specification at which to execute proxy activity code;

identifying proxy activity code comprising a plurality of elements configured to perform defined features of the protocol;

identifying a protocol-code association specifying, for the identified points in the protocol specification, corresponding ones of the elements of the proxy activity code to invoke; and instantiating at runtime the generic reusable computer proxy that invokes the specified elements of the proxy activity code at the corresponding identified points during decomposition of the protocol.

2. The computer program product of claim 1 wherein the protocol specification consists solely of the non-executable data and does not contain any executable code.

3. The computer program product of claim 1 wherein the proxy activity code consists solely of non-executable data and does not contain any executable code.

4. The computer program product of claim 1 wherein the protocol specification and the proxy activity code are updated independently of each other and independently of execution of the proxy.

5. The computer program product of claim 1 wherein the proxy activity code is written in a scripting language.

6. The computer program product of claim 1 wherein the protocol specification is generated by a protocol specification compiler.

7. The computer program product of claim 6 wherein an input to the protocol specification compiler is a protocol specification in a grammatical form.

8. The computer program product of claim 7 wherein the grammatical form is a grammar from the group of grammars comprising Backus-Naur Form (BNF), Extended Backus-Naur Form (EBNF), Augmented Backus-Naur Form (ABNF), natural language, regular expression, and a grammar understood by a software parser tool Lex, Yacc, Gold, or Spirit.

9. The computer program product of claim 1 wherein the generic reusable computer proxy invokes the specified elements of the proxy activity code at the appropriate points of the decomposition of the protocol to provide a secure treatment of the protocol.

10. The computer program product of claim 1, the computer program product further comprising computer program instructions for:
identifying second proxy activity code configured to perform defined features of the protocol, the second proxy activity code performing different activities than the first proxy activity code;
wherein the protocol-code association additionally specifies, for the identified points in the protocol specification, elements of the second proxy activity code to invoke.

11. The computer program product of claim 1, wherein the protocol specification is a data file that represents a grammar defining the protocol.

12. A computer-implemented method for implementing a generic reusable computer proxy, said method comprising the steps of:
identifying a protocol specification associated with a given protocol, the protocol specification including non-executable data facilitating decomposition of the protocol, the non-executable data comprising information identifying a plurality of points in the protocol specification at which to execute proxy executable code;
identifying proxy activity code comprising a plurality of elements configured to perform defined features of the protocol;
identifying a protocol-code association specifying, for the identified points in the protocol specification, corresponding ones of the elements of the proxy activity code to invoke; and
instantiating at runtime the generic reusable computer proxy that invokes the specified elements of the proxy activity code at the corresponding identified points during decomposition of the protocol.

13. The method of claim 12 wherein the protocol-code association consists solely of non-executable data and does not contain any executable code.

14. The method of claim 12 wherein the protocol specification and the proxy activity code are updated independently of each other and independently of execution of the proxy.

15. The method of claim 12 wherein the proxy activity code is written in a scripting language.

16. The method of claim 12 wherein the protocol specification is generated by a protocol specification compiler.

17. The method of claim 16 wherein an input to the protocol specification compiler is a protocol specification in a grammatical form.

18. The method of claim 17 wherein the grammatical form is a grammar from the group of grammars comprising Backus-Naur Form (BNF), Extended Backus-Naur Form (EBNF), Augmented Backus-Naur Form (ABNF), natural language, regular expression, and a grammar understood by a software parser tool.

19. The method of claim 12 wherein the computer proxy invokes the specified elements of the proxy activity code at the appropriate points of the decomposition of the protocol to provide a secure treatment of the protocol.

20. A computer system comprising:
a computer processor; and
a computer program product having a computer-readable storage medium having computer program instructions executable by the computer processor embodied therein for implementing a generic reusable computer proxy, the computer program product comprising computer program instructions for:
identifying a protocol specification associated with a given protocol, the protocol specification including non-executable data facilitating decomposition of the protocol, the non-executable data comprising information identifying a plurality of points in the protocol specification at which to execute proxy activity code;
identifying proxy activity code comprising a plurality of elements configured to perform defined features of the protocol;
identifying a protocol-code association specifying, for the identified points in the protocol specification, corresponding ones of the elements of the proxy activity code to invoke; and
instantiating at runtime the generic reusable computer proxy that invokes the specified elements of the proxy activity code at the corresponding identified points during decomposition of the protocol.

21. The computer system of claim 20 wherein the protocol specification consists solely of the non-executable data and does not contain any executable code.

22. The computer system of claim 20 wherein the proxy activity code consists solely of non-executable data and does not contain any executable code.

23. The computer system of claim 20 wherein the protocol specification and the proxy activity code are updated independently of each other and independently of execution of the proxy.

24. The computer system of claim 20 wherein the protocol specification is generated by a protocol specification compiler, and wherein an input to the protocol specification compiler is a protocol specification in a grammatical form.

25. The computer system of claim 24 wherein the grammatical form is a grammar from the group of grammars comprising Backus-Naur Form (BNF), Extended Backus-Naur Form (EBNF), Augmented Backus-Naur Form (ABNF), natural language, regular expression, and a grammar understood by a software parser tool.

26. The computer system of claim 20, wherein the generic reusable computer proxy invokes the specified elements of the proxy activity code at the appropriate points of the decomposition of the protocol to provide a secure treatment of the protocol.

* * * * *